Sept. 1, 1959 — O. PITT — 2,902,671
CURB FEELER
Filed Nov. 12, 1957

Olas Pitt
INVENTOR.

2,902,671

CURB FEELER

Olas Pitt, Paducah, Ky.

Application November 12, 1957, Serial No. 695,734

2 Claims. (Cl. 340—61)

This invention relates generally to attachments for motor vehicles, and more particularly to a curb feeler.

The primary object of this invention is to provide a curb feeler for vehicles which may be attached to a vehicle and indicate to the motorist, his proximity to a curb when parking, or his proximity to other objects which he may desire to park close to.

Another object of this invention is to provide a curb feeler, which has a signalling device inside the vehicle, so that the driver in parking may quickly detect the signalling devices.

A further object of this invention is to provide a curb feeler which is a definite improvement over the conventional, scraping types of feelers, which emit harsh and annoying noises when they are in contact with a curb. This object is accomplished by the use of a resilient knob on the end of the feeler, and the use of an electric circuit for actuating the signalling device, instead of depending on the driver's listening to scraping sounds, as is the case with the conventional type of feeler.

An even further object of this invention is to produce a simple and inexpensive device and yet one which is exceedingly effective for the purpose for which it is designed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
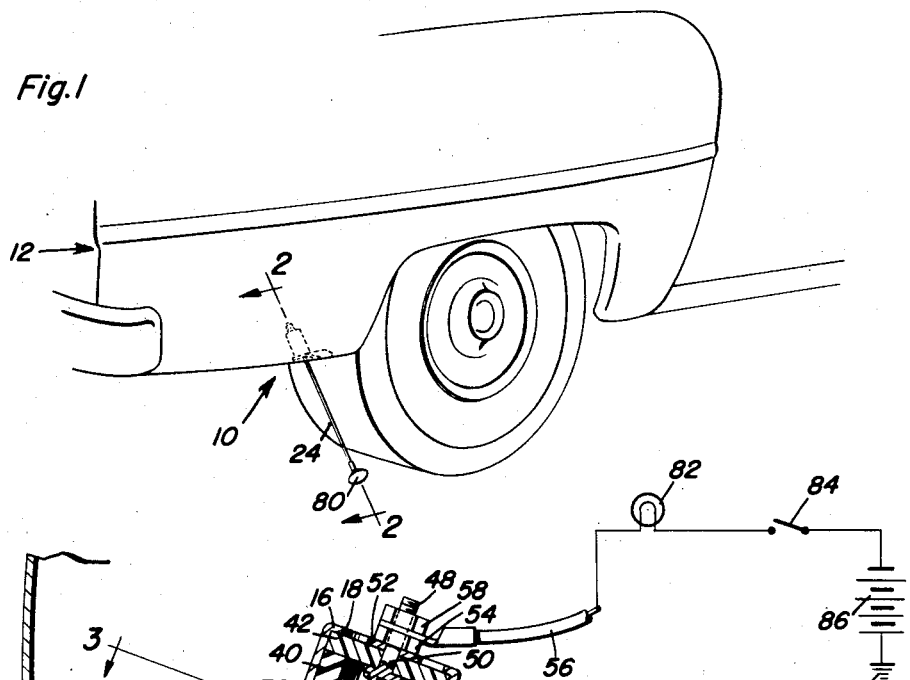
Figure 1 is a perspective view of the curb feeler comprising the present invention, illustrating its use when connected to the fender of an automobile.
Figure 2:
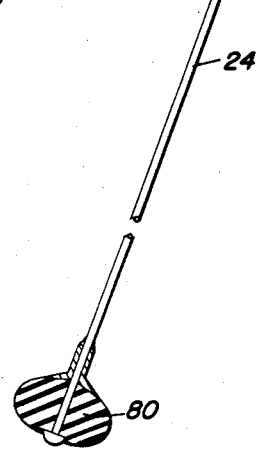
Figure 2 is a sectional view, considerably enlarged, taken substantially along the plane defined by reference line 2—2 of Figure 1 illustrating details of construction thereof.
Figure 3:
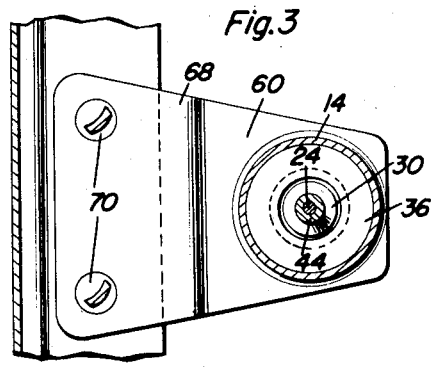
Figure 3 is a partial sectional view taken substantially along the plane defined by reference line 3—3 of Figure 2.

Referring now more specifically to the drawings, the numeral 10 generally designates the curb feeler comprising the present invention, illustrating the same as connected to the rear fender of an automobile 12.

This feeler is generally constructed of a cylindrical, electric conducting casing, having an open bottom, and inwardly extending flanges 16, which define an opening 18. A rubber plug 20 is inserted into the casing, and is located at the bottom portion thereof. A bore 22 is formed to the central portion of plug 20. A feeler rod 24, of a flexible metallic construction, is inserted into bore 22, and is fixed therein by means of washers 26 and 28 which are connected to rod 24 at the upper and lower surfaces respectively of plug 20. These washers 26 and 28 are further held to rod 24 by means of nipples 30 and 32. A hollow substantially cylindrical spacer made of rubber 34 is placed on top of plug 20, and serves to space washer 36 therefrom. This washer 36 has a central opening 38 formed therethrough. A second rubber spacer 40, of the same general dimensions and shape as spacer 34 is placed on top of washer 36, and serves to space a fiber plug 42, from washer 36. The upper end of rod 24, is disposed centrally of the opening 38 and washer 36. A contact 44 is fixed to the upper end of rod 24, and serves to enlarge the upper end of this rod. A coil spring 46 is attached to the upper end of contact 44, and is interposed between the latter and the head of a terminal bolt 48, which is disposed through aperture 50 located centrally of the fiber plug 42. It is to be noted that aperture 50 and plug 42, opening 38 in washer 36, and bore 22 in plug 20, are all in alignment. A washer 52 is disposed about plug 48, on the upper surface of fiber plug 42. A nut 54 is then threaded down on bolt 48 and serves to rigidify the bolt 48 so that washer 52 will be held in place as well as spring 46. An electric conductor 56, has one end connected to terminal 48, and is disposed between nuts 54 and 58, which are threaded on bolt 48, the nut 58 being threaded down toward the nut 54, so as to hold electric conductor 56 firmly in place.

A bottom plate 60 is connected to the bottom of casing 14, by welding 62 or any other suitable means. The bottom plate 60 has an opening 64 formed therethrough, larger than and aligned with bore 22. This opening 64 is defined by a downwardly depending flange 66, which is spaced from and connected to rod 24. The mounting bracket 63 is connected to bottom plate 60, and at an angle thereto. This plate may be constructed integrally with the bottom plate 68. Plate 68 has an opening, or pair of openings so as to accommodate a bolt 70 to be passed therethrough, and into a flange portion 72 of a car fender 74. A mounting plate 68 would then be held fixed to flange 72 of the fender, by passing a washer 76 onto the shank or bolt and threading nut 78 thereon.

At the outer free end of rod 24, is connected a rubber knob 80, which serves to keep the action of this feeler quiet so as to eliminate harsh and annoying noices.

In the use of this device, it would be connected to the fender of an automobile, and extend downwardly and outwardly therefrom as may be seen in Figure 1, so as to be capable of contacting a curb when the automobile is being parked. Upon contact with the curb, the knob 80 will move therealong, and serve to bend rod 24, which will pivot about a point in plug 20, and move contact 44 into engagement with washer 36. This will serve to activate a signalling device located inside the automobile, so that the detection of the curb by knob 80, will be indicated to a driver inside the automobile.

A signalling bulb 82, is located near the driver of an automobile, and is connected to electric conductor 56. A switch 84 is connected to bulb 82, and the switch 84 will be connected across the ignition switch, so that whenever the ignition is on, the switch 84 will be closed. A battery 86 is connected to switch 84 at one end, and is grounded as at 88 on the other end. The battery 86, switch 84, bulb 82 and bolt terminal 48, are all connected in series. The battery 86 is grounded at 88 to the automobile itself. The casing 14 is grounded through plate 60, to mounting plate 68, thence to flange 72 and then to the fender 74 of the automobile 12. Thus, the washer 36 is also grounded to the automobile, and when contact 44 touches washer 36, the circuit is closed thus lighting up bulb 82, and indicating to the driver of the automobile that he is in close proximity to the curb.

It may now be seen that I have herein shown and described a new and improved type of curb feeler which has numerous advantages over feelers used previously in the art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A curb feeler comprising an open ended electric conducting cylindrical casing, a rubber plug in the bottom of said casing having a bore therethrough, a plate closing the bottom of said casing having an opening therein of smaller dimensions than the bottom end of said casing, a washer disposed centrally in said casing and connected electrically thereto having an opening therein aligned with said bore, a first dielectric spacer interposed between said rubber plug and said washer, a feeler rod in said bore, means locking said rod in place in the plug, the end of said rod located within said casing having a contact thereon disposed through the opening in said washer, and normally spaced therefrom, a rubber knob on the other end of said rod, a fiber plug in the top of said casing having an aperture therethrough in alignment with said bore, an electric terminal disposed through the aperture and locked to said fiber plug, a second dielectric spacer interposed between said fiber plug and said washer, a coil spring intermediate said terminal and said contact, a flange on said casing holding said fiber plug within the casing, an electric responsive signal element connected to said terminal, a switch, a grounded battery, all connected in series, said casing being grounded whereby upon movement of said rod from the normal position contact between said rod and said casing takes place.

2. A curb feeler comprising an open ended, electric conducting cylindrical casing, a rubber plug in the bottom of said casing having a bore therethrough, a plate closing the bottom of said casing having an opening therein of smaller dimensions than the bottom end of said casing, a washer disposed centrally in said casing and connected electrically thereto having an opening therein aligned with said bore, a first dielectric spacer interposed between said rubber plug and said washer, a feeler rod in said bore, means locking said rod in place in the plug, the end of said rod located within said casing having a contact thereon disposed through the opening in said washer and normally spaced therefrom, a rubber knob on the other end of said rod, a fiber plug in the top of said casing having an aperture therethrough in alignment with said bore, an electric terminal disposed through the aperture and locked to said fiber plug, a second dielectric spacer interposed between said fiber plug and said washer, a coil spring intermediate said terminal and said contact a flange on said casing holding said fiber plug within the casing.

References Cited in the file of this patent
UNITED STATES PATENTS 2,592,742     Rose _____ Apr. 15, 1952